United States Patent
Popp

(10) Patent No.: US 9,025,254 B2
(45) Date of Patent: May 5, 2015

(54) DUAL ROW OPTICAL FIBER ARRAY

(75) Inventor: Gregor Popp, Munich (DE)

(73) Assignee: Schleifring und Apparatebau GmbH (DE)

( * ) Notice: Subject to any disclaimer, the term of this patent is extended or adjusted under 35 U.S.C. 154(b) by 273 days.

(21) Appl. No.: 13/591,446

(22) Filed: Aug. 22, 2012

(65) Prior Publication Data

US 2013/0050837 A1   Feb. 28, 2013

(51) Int. Cl.
*G02B 27/30* (2006.01)
*G02B 6/32* (2006.01)
*G02B 6/26* (2006.01)
*G02B 6/36* (2006.01)

(52) U.S. Cl.
CPC ............ *G02B 6/3604* (2013.01); *G02B 6/3636* (2013.01); *G02B 6/3652* (2013.01); *G02B 6/3672* (2013.01)

(58) Field of Classification Search
USPC ................................. 359/641; 385/31, 34, 52
See application file for complete search history.

(56) References Cited

U.S. PATENT DOCUMENTS

| 5,371,814 | A | 12/1994 | Ames et al. |
| 6,704,483 | B2 | 3/2004 | Sherman et al. |
| 8,050,530 | B2 * | 11/2011 | Martinez et al. ............... 385/137 |
| 2004/0165854 | A1 | 8/2004 | Niiyama et al. |

* cited by examiner

*Primary Examiner* — Jack Dinh
(74) *Attorney, Agent, or Firm* — Yakov Sidorin; Quarles & Brady LLP

(57) ABSTRACT

A fiber array for receiving a plurality of light-guiding fibers has a substrate with V grooves for guiding light-guiding fibers. These are fixed inside the V grooves by covers. In order to achieve a better utilization of space, the light-guiding fibers are disposed in two planes. To this end, first fibers in V grooves are fixed on the surface of the substrate in one plane. Second fibers are fixed by V grooves in recesses between the first fibers in a second parallel plane. Here a processing of the substrate may be done without changing clamping or re-clamping of the substrate. Particularly small production tolerances can be achieved by this means.

11 Claims, 3 Drawing Sheets

DUAL ROW OPTICAL FIBER ARRAY

CROSS-REFERENCE TO RELATED APPLICATIONS

This application claims priority from German Patent Application No. DE 10 2011 081 376.4 filed on Aug. 23, 2011. The disclosure of the above-referenced patent application is incorporated herein in its entirety by reference.

TECHNICAL FIELD

The invention relates to fiber-optic collimators, and, in particular, to fiber-optic collimator configured for use in optical rotary joints and a method for producing fiber collimators.

BACKGROUND ART

Optical rotary joints for the simultaneous transmission of several channels usually use a derotating optical element such as, for example, the one including now abandoned a Dove prism. U.S. Pat. No. 5,371,814 discloses an example of such rotary joint. Here, GRIN lenses are used to collimate the light from glass fibers. The lenses must be individually adjusted. An improvement can be achieved by combining a plurality of fibers with a common fiber holder to form a fiber array. Such a fiber array is disclosed, for example in US 2004/0165854 A1. The fibers are shown to be aligned in V grooves and fixed with a retaining plate. A Dove prism, which has a circular imaging area, cannot be effectively used with a linear fiber arrangement according to this document. An improvement, disclosed in U.S. Pat. No. 6,704,483 B2, is based on a plurality of one-dimensional fiber arrays that are held with respect to one another by a precise but structurally complex holder with means for alignment of the individual fiber arrays.

SUMMARY OF THE INVENTION

Embodiments of the present invention are directed to a two-dimensional (2D) fiber array configured for use in fiber-optic (FO) collimators and, in particular, in FO-collimators for optical rotary joints in such a manner as to ensure technologically simple, cost-efficient, and high precision operational structure. Further embodiments relate to optical rotary joints comprising a two-dimensional fiber array and a method for producing fiber collimators.

In an embodiment, a fiber array has two rows of fibers that are disposed in mutually offset planes. The fiber array is further based or positioned on a substrate that can be manufactured without changing the clamping (or, without reclamping), thereby ensuring a very high precision assembly. To this end, the substrate has V grooves for receiving first light-guiding fibers in a first plane. Located between the V grooves of the first plane are recesses having further V grooves in a second plane for receiving second light-guiding fibers. The first plane and the second plane are spaced, with respect to one another, in a predefined fashion. Consequently, the light-guiding fibers associated with the first plane are spaced apart from the light-guiding fibers associated with the second plane. The V grooves corresponding to either the first or the second plane can be produced without changing clamping or re-clamping of the substrate. As a result, positional tolerances of individual V grooves with respect to one another are advantageously ensured to be extremely tight. Covers are provided for fixing the light-guiding fibers in the V grooves. Preferably a first cover covers the light-guiding fibers of the first plane whilst a second cover (which may comprise a plurality of preferably strip-shaped segments) covers the light-guiding fibers of the second plane. Alternatively, there may be a plurality of strip-shaped covers. These covers can themselves be held by a finger-shaped holder.

In a further embodiment, the fiber array includes a first substrate and a second substrate, which are connected and/or attached to one another along corresponding substantially flat surfaces. Here, the fibers associated with the first plane are disposed on the upper side of the first substrate and the fibers associated with the second plane are disposed on the upper side of the second substrate. The fixing of the fibers in the corresponding V grooves is accomplished in a fashion similar to that described above.

A fiber-optic collimator contains at least one of the fiber arrays.

Furthermore, an optical rotary joint includes at least one collimator and/or at least one of the fiber arrays.

The embodiments are not limited to those including a dual-row arrangement of optical fibers. Generally, an embodiment of the invention may include any other number of such rows.

The term fibers as used in this document refers, generally, to light-guiding fibers, such as single-mode or multi-mode optical fibers, which may be made, for example, of glass or plastic.

BRIEF DESCRIPTION OF THE DRAWINGS

In the following, the invention will be described by way of examples of embodiments, without limitation of a general inventive concept, and with reference to the drawings among which.

Figure 1:
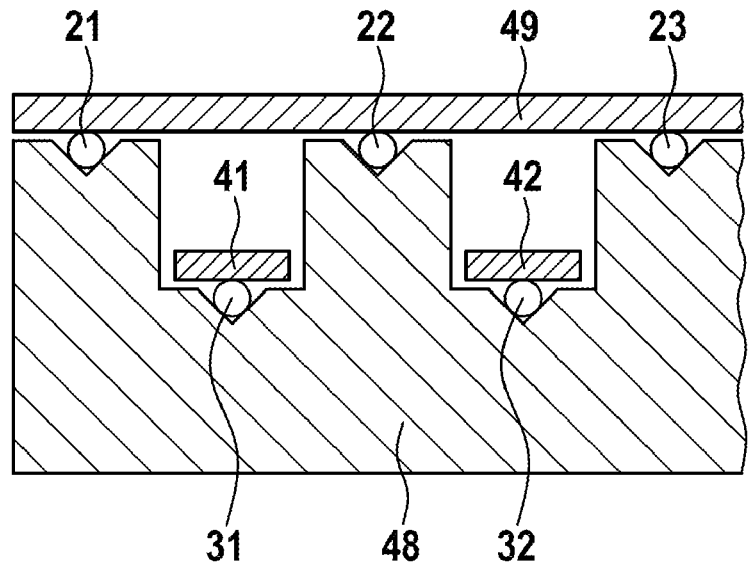
FIG. 1 is a cross-sectional view of a fiber array.

While the invention allows for various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
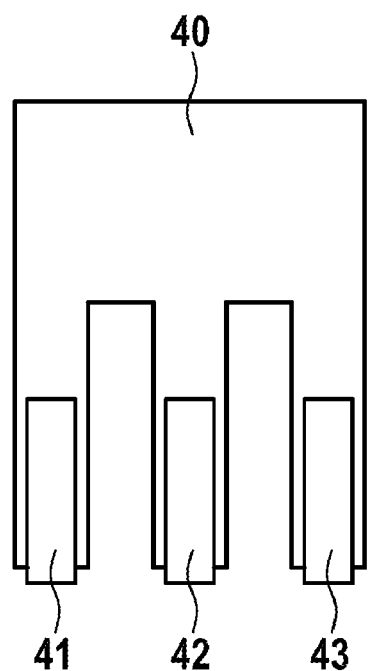
FIG. 2 is a diagram depicting a holder with covers.

FIG. 1 shows a cross-sectional view of a fiber array according to an embodiment of the invention. A substrate 48 made of a material that is suitable for manufacturing micro-optic components (such as, for example, glass, silicon or germanium) is used to receive and operably cooperate with the first light-guiding fibers 21, 22, 23, and the second light-guiding fibers 31, 32. For this purpose, at the points at which the fibers rest the substrate has V-shaped grooves extended in longitudinal directions of the corresponding fibers. In order to achieve optimal utilization of space, the first fibers 21, 22, 23 are disposed in a first plane and the second fibers 31, 32 are disposed in a second plane that is parallel to the first plane. As shown, the V grooves for receiving the second fibers 31, 32 in the second plane are disposed in recesses or trenches that are formed, in the substrate 48, at locations between the V grooves that are configured to receive the fibers associated with the first plane. As a result, the second plane generally lies below the first plane. In this example, the processing of the substrate 48 can be accomplished without changing clamping or re-clamping of the substrate from the top, thereby ensuring that deviations in mutual location and/or orientation of the V grooves between the two planes, as compared to the ideal case, are reliably extremely small. The achieved result (that tolerances in mutual positioning of the elements of the embodiment such as V grooves, for example are ensured to be very tight and that positional deviations are extremely small) facilitates, in practice, optimization of coupling of light upon propagation through an optical train to which an embodiment of the invention belongs. A first cover 49 and second covers 41, 42 (as well as an additional cover 43 of FIG. 2 discussed below) are provided in order to fix the light-guiding fibers in the corresponding V grooves. A cover for at least two fibers is preferably provided for the first plane. Individual covers 41, 42 of FIG. 1 and 43 of FIG. 2 are provided for the fibers 31, 32 corresponding to the second plane. Such covers preferably lie below the cover 49 of the first plane. In order to hold these covers in defined positions, the covers are preferably disposed on a holder 40.

FIG. 2 shows a holder 40 with individual covers 41, 42, 43 for fixing the fibers positioned at and associated with the second plane of the FO array. In an embodiment that includes more than two rows of optical fibers (each of which rows, in this case, would be positioned at and associated with a corresponding plane, thereby resulting in a FO array device having more than two planes in which rows of optical fibers are positioned), there may be used a plurality of holders 40, preferably one for each row of optical fibers.

Figure 3:
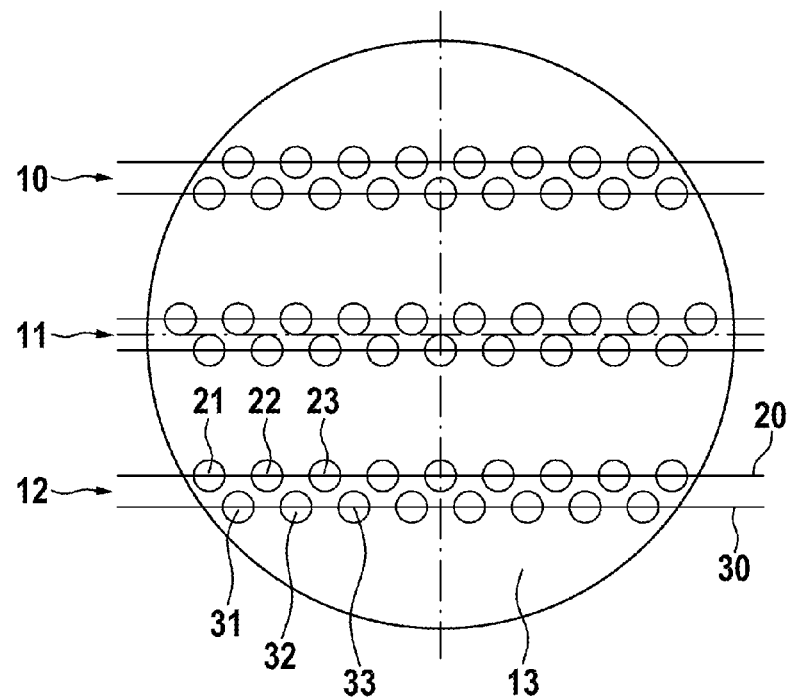
FIG. 3 is a diagram illustrating the arrangement of fiber arrays in the imaging zone of a derotating element.

FIG. 3 shows the arrangement of fiber arrays in the imaging area 13 of a derotating optical element such as is used, for example, in an optical rotary joint. The term imaging area as used herein generally refers to the optically useable area associated with an optical element (in one example—a Dove or other prism of a derotation element). The embodiment of FIG. 3 is shown to contain three fiber arrays 10, 11, 12. In the third fiber array 12, the fibers 21, 22, 23 corresponding to the first plane 20 and the fiber 31, 32, 33 corresponding to the second plane 30 are designated in a more exemplary manner. The fiber arrays 10, 11 and 12 are separated from one another by an air gap.

Figure 4:
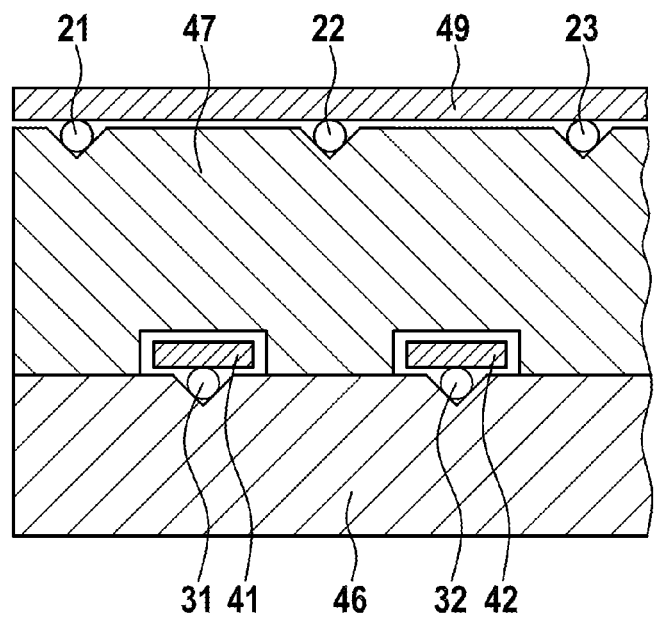
FIG. 4 is a cross-sectional view of another embodiment of a fiber array.

FIG. 4 shows another embodiment of a fiber array. A dual substrate configuration for supporting optical fibers includes a first substrate 47 and a second substrate 46. The substrates 46, 47 are planed flat with high precision. As a result, tight tolerancing of positioning of (for example, tight tolerancing on spacing(s) between) the V grooves of/between the first plane and the second plane (and associated predetermination of small errors in such positioning) is again obtained. The two substrates are preferably joined together by wringing in optical contact.

Figure 5:
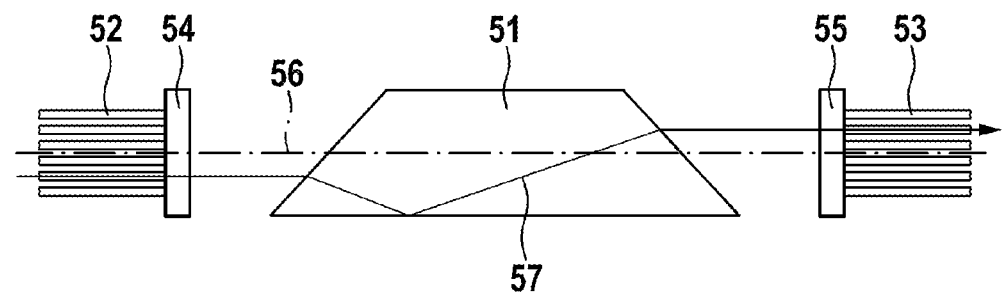
FIG. 5 shows as an example an optical rotary joint with a derotating optical element.

FIG. 5 shows in schematic form an example of the embodiment with an optical rotary joint which comprises at least one collimator system. The first optical rotary joint has a first collimator arrangement 54 for coupling in light from the first optical waveguides 52. It further has a second collimator arrangement 55 for coupling in light from the second optical waveguide 53. The second collimator arrangement is mounted rotatably about an axis of rotation 56 to the first collimator arrangement. A derotating optical element, shown here for example as containing a Dove prism 51, is disposed in the beam path between the first collimator arrangement and the second collimator arrangement in order to compensate for the rotary movement. It is rotated here at half the rotational speed of the first collimator arrangement with respect to the second collimator arrangement. An example light path 57 shows the light guidance from one of the first optical waveguides 52 via the first collimator arrangement 54 through the Dove prism 51 via the second collimator arrangement 55 into one of the second optical waveguides 53.

It will be appreciated to those skilled in the art having the benefit of this disclosure that this invention is believed to provide optical rotary joints and micro-optical systems, such as collimators, used for multi-channel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 First fiber array
11 Second fiber array
12 Third fiber array
13 Imaging area of derotating element
20 First plane
21, 22, 23 First fibers in the first plane
30 Second plane
31, 32, 33 Second fibers in the second plane
40 Holder for cover
41, 42, 43 Second cover for fibers of the second plane
46 Second substrate
47 First substrate
48 Substrate
49 First cover for fibers of the first plane
51 Derotating optical element
52 First optical waveguide
53 Second optical waveguide
54 First collimator arrangement
55 Second collimator arrangement
56 Axis of rotation
57 Beam path

The invention claimed is:

1. A fiber array device configured to receive first and second pluralities of light-guiding fibers, said fiber array device comprising:
a substrate having a surface defining first and second planes such that said first and second planes identify first and second levels of said surface,
wherein said surface includes V grooves that are formed at each of said first and second levels and adapted to receive light-guiding fibers, and
wherein V grooves formed at the second level are formed in recesses, of said surface, that are located between V grooves formed at the first level;
first and second pluralities of light-guiding fibers disposed in V grooves respectively corresponding to first and second levels of said surface; and
fiber covers positioned to fix light-guiding fibers from said first and second pluralities in respectively-corresponding V grooves such that the first plurality of light-guiding fibers is fixed with a first fiber cover and light-guiding fibers from the second plurality of light-guiding fibers are fixed with at least one second fiber cover disposed in a recess of said surface.

2. The fiber array device according to claim 1, wherein the at least one second fiber cover is held in place by a finger-shaped holder.

3. The fiber array device according to claim 1, wherein said first and second planes are substantially parallel to one another.

4. The fiber array device according to claim 1, wherein said V grooves are substantially parallel to one another and a cross-section of said substrate, defined in a plane that is substantially transverse to a V groove, has a serrated edge.

5. An optical collimator comprising at least one fiber array device according to claim 1 and lenses attached in optical cooperation with ends of light-guiding fibers of said at least one fiber array device.

6. An optical rotary joint comprising a derotating optical element in optical communication with at least one of (i) an optical collimator according to claim 5; and (ii) a fiber array device according to claim 1.

7. A fiber array device comprising a fiber holder that includes
- a first substrate having a first substantially flat surface with first V grooves therein;
- a second substrate having a second surface defining a second plane and a third surface defining a third plane,
  - wherein the second surface has trenches disposed therein and
  - the third surface has third V grooves disposed therein in such a fashion that footprints of said third V grooves, defined by projection of said third V grooves onto the second plane along a direction substantially perpendicular to the second plane, do not overlap with said trenches; and
- a top cover plate positioned next to said second substrate such as to sandwich said second substrate between the cover plate and the first substrate.

8. The fiber array device according to claim 7, wherein the second substrate is in contact with the first substantially flat surface along the second plane such that each of the trenches is spatially coordinated with a corresponding first V groove, and further comprising
- first light-guiding fibers disposed in said first V grooves and third light-guiding fibers disposed in said third V grooves, and
- first cover plates disposed on top of respectively corresponding first light-guiding fibers within the bounds of respectively corresponding trenches such as to fix said first light-guiding fibers in their respective positions,
- wherein said top cover plate is in contact with said third plane such as to fix said third-light-guiding fibers in their respective positions.

9. The fiver array device according to claim 8, wherein a facet of said first substrate, a facet of the second substrate, a facet of the top plate, and facets of first and third light-guiding fibers are disposed in a substantially planar surface.

10. An optical collimator comprising at least one fiber array device according to claim 8 and lenses disposed in optical cooperation with facets of first and third light-guiding fibers of said at least one fiber array device such.

11. An optical rotary joint comprising a derotating optical element in optical communication with at least one of (i) an optical collimator according to claim 10; and (ii) a fiber array device according to claim 8.

* * * * *